United States Patent [19]

McNeary

[11] 4,047,744
[45] Sept. 13, 1977

[54] LOCKABLE GAS TANK CAP DEVICE

[75] Inventor: Richard C. McNeary, Forrest City, Ark.

[73] Assignee: The Raymond Lee Organization, Inc., New York, N.Y. ; a part interest

[21] Appl. No.: 682,480

[22] Filed: May 3, 1976

[51] Int. Cl.² ........................ B65D 55/14; B65D 43/16
[52] U.S. Cl. ..................................... 292/171; 70/160; 220/210
[58] Field of Search ....... 292/171, DIG. 14, DIG. 23, 292/DIG. 16; 70/160, 164, 158, 159, 161, 162; 220/210, 254, 259, 263, 264, 335, 344

[56] References Cited

U.S. PATENT DOCUMENTS

| 1,902,456 | 3/1933 | Matthews | 220/210 X |
| 2,033,432 | 3/1936 | Leach | 220/344 X |
| 2,491,791 | 12/1949 | Allen | 70/158 UX |
| 3,930,388 | 1/1976 | Barras | 220/210 X |

FOREIGN PATENT DOCUMENTS

| 2,209,810 | 10/1972 | Germany | 70/162 |
| 509,115 | 10/1952 | Italy | 70/162 |

Primary Examiner—J. Franklin Foss
Attorney, Agent, or Firm—Daniel Jay Tick

[57] ABSTRACT

A lockable gas tank cap device comprises a cover hingedly affixed to a vehicle in the area of the open end of a gasoline tank of the vehicle in a manner whereby it covers the open end in a closed position and is free from the open end in an open position. A spring-biased pin is biased by a spring and slidably mounted on the vehicle in proximity with the cover for locking the cover in closed position under the force of the spring. A cable is affixed to the pin and extends into the vehicle for moving the pin against the force of the spring to release the cover for movement to its open position.

2 Claims, 4 Drawing Figures

LOCKABLE GAS TANK CAP DEVICE

DESCRIPTION OF THE INVENTION

The present invention relates to a lockable gas tank device. More particularly, the invention relates to a lockable gas tank device for releasably locking the open end of a gasoline tank of a vehicle.

Objects of the invention are to provide a lockable gas tank device of simple structure, which is inexpensive in manufacture, installable in new and existing vehicles, controlled from inside the vehicle, eliminates the need for siphon-preventing devices, and functions efficiently, effectively and reliably to securely lock the gas tank of the vehicle under the control of the operator of the vehicle.

In order that the invention may be readily carried into effect, it will now be described with reference to the accompanying drawing, wherein.

Figure 1:
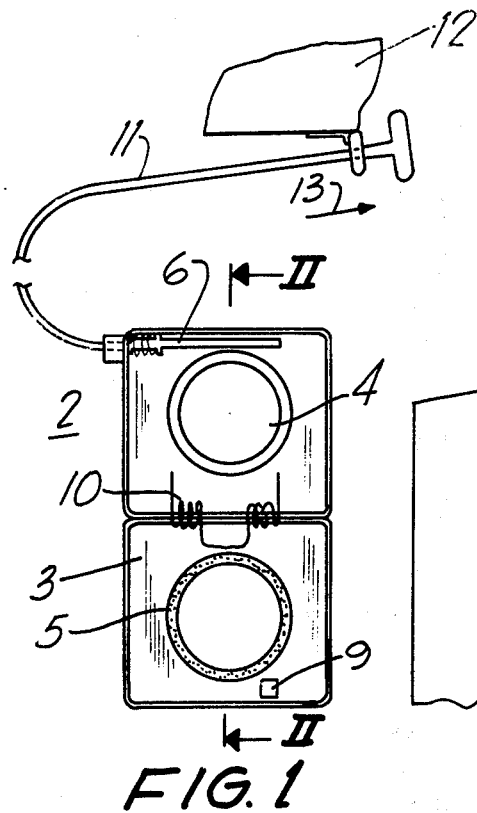
FIG. 1 is a view of an embodiment of the lockable gas tank cap device of the invention in open position.

The lockable gas tank cap device of the invention is for releasably locking the open end of a gasoline tank 1 (FIG. 2) of a vehicle 2 (FIG. 1).

Figure 2:
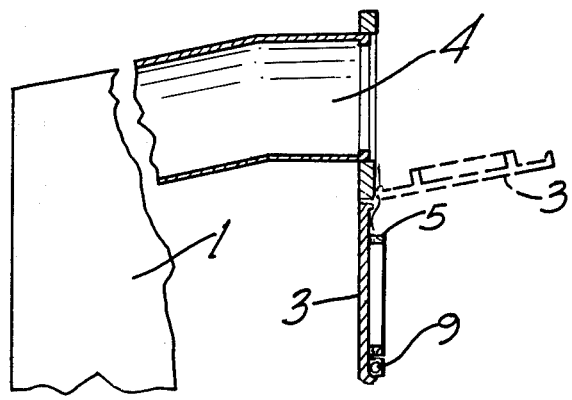
FIG. 2 is a sectional view, taken along the lines II—II, of FIG. 1.

The lockable gas tank cap device of the invention comprises a cover 3 (FIGS. 1 to 4) hingedly affixed to the vehicle 2 in the area of the open end 4 of the gasoline tank 1 thereof, as shown in FIGS. 1 and 2. The cover 3 is affixed to the vehicle 2 in a manner whereby it covers the open end 4 of the gas tank 1 in a closed position, shown in FIGS. 3 and 4, and is free from the open end in an open position, shown in FIGS. 1 and 2.

An annular gasket 5 is provided on an inside surface of the cover 3 for sealing the open end 4 of the gasoline tank 1 when the cover is in its closed position.

Figure 3:
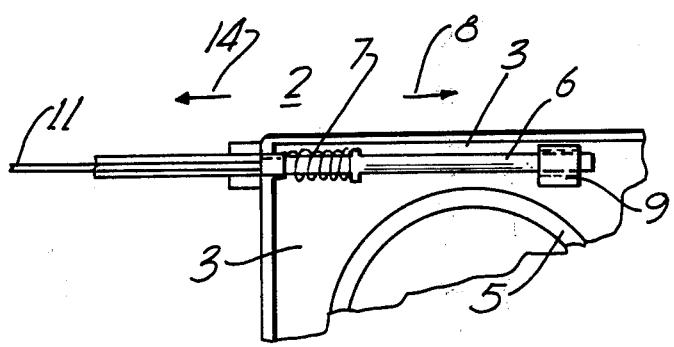
FIG. 3 is a view, on an enlarged scale, of the spring-biased pin of the lockable gas tank cap device of the invention.
Figure 4:
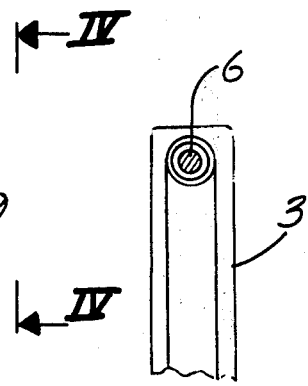
FIG. 4 is a view, taken along the lines IV—IV, of FIG. 3.

A spring-biased pin 6 (FIGS. 1, 3 and 4) is slidably mounted on the vehicle 2 in proximity with the cover 3 for locking the cover in closed position under the force of a spring 7 which biases said pin in the direction of an arrow 8 in FIG. 3. Thus, the pin 6 is slidably mounted via suitable loop-type or ring bolt type projections extending from the vehicle and not shown in the Figures in order to enhance the clarity of presentation, in the manner of a slide bolt.

The cover 3 has a loop-type or ring bolt type projection 9 extending from the inside surface thereof (FIGS. 1, 2 and 3). When the cover is to be placed in its closed position and locked, it is moved by a spring 10 which urges it into a position whereby the gasket 5 effectively seals the open end 4 of the gas tank 1. The pin 6 is then urged by the spring 7 into the projection 9 thereby locking the cover 3 in its closed position.

A cable 11 (FIGS. 1 and 3) is affixed to the pin 6 and extends into the vehicle 2. The cable 11 may thus be supported under the dashboard 12 of the vehicle, as shown in FIG. 1. When the operator of the vehicle pulls the cable 11 in the direction of an arrow 13 in FIG. 1, the cable moves the pin 6 in the direction of an arrow 14 in FIG. 3 against the force of the spring 7 and releases the cover 3 for movement to its open position.

While the invention has been described by means of a specific example and in a specific embodiment, I do not wish to be limited thereto, for obvious modifications will occur to those skilled in the art without departing from the spirit and scope of the invention.

I claim:

1. A lockable gas tank device for releasably locking the open end of a gasoline tank of a vehicle, said gas tank cap device comprising a cover hingedly affixed to a vehicle in the area of the open end of the gasoline tank thereof in a manner whereby it covers said open end in a closed position and is free from said open end in an open position, said cover having a pair of first and second spaced parallel edges and a third edge perpendicular to and joining the first and second edges;

a loop-type projection extending from the inside of the cover adjacent the third edge and spaced from the first and second edges, said projection being at least twice the distance from the first edge that it is from the second edge;

a spring-biased pin biased by a spring and slidably mounted on the vehicle in proximity with the cover for locking the cover in closed position under the force of the spring, the pin being closely adjacent and parallel to the third edge of the cover and extending across the cover from the first edge of the cover into the projection in closed position; and cable means affixed to the pin and extending into the vehicle for moving the pin out of the projection against the force of the spring to release the cover for movement to its open position.

2. A lockable gas tank cap device as claimed in claim 1, further comprising a substantially annular gasket on an inside surface of the cover for sealing the open end of the gasoline tank when the cover is in its closed position.

* * * * *